I. KING.
SINGLE CHAMBER OVEN.
APPLICATION FILED APR. 6, 1921.

1,433,893. Patented Oct. 31, 1922.

INVENTOR:
IVAN KING,
BY
Graham + Lawrie
ATTORNEYS.

Patented Oct. 31, 1922.

1,433,893

UNITED STATES PATENT OFFICE.

IVAN KING, OF LOS ANGELES, CALIFORNIA.

SINGLE-CHAMBER OVEN.

Application filed April 6, 1921. Serial No. 458,966.

*To all whom it may concern:*

Be it known that I, IVAN KING, a citizen of the United States, residing at Los Angeles, in the county of Los Angeles and State of California, have invented a new and useful Single-Chamber Oven, of which the following is a specification.

This invention relates to ovens, and relates particularly to those ovens in which baking may be proceeded with, as a continuous operation.

It is an object of my invention to provide an oven of this type in which the heat is very uniformly distributed.

Ovens of the continuous baking type generally derive their heat from combustion chambers placed beneath the baking chambers so that the firing of the oven will not interfere with the continuous baking operation within the baking chamber, the flues then passing over the top of the oven. This arrangement results in the uneven heating of various parts of the oven.

In a previous invention, covered by United States Letters Patent No. 1,256,907, I overcome this undesirable feature by providing equalizing channels surrounding the baking chamber, whereby a portion of the heat that would othrwise be radiated from the floor is conveyed to the upper part of the baking chamber. Although the above arrangement has proven to be distinct improvement over the previous types it has the disadvantage of maintaining a greater heat at one side of the baking chamber than is maintained at the other side.

It is a further object of my invention to provide an improved form of equalizing channel by which the two sides of the oven will be equally heated and which will be set forth in the following specification.

Referring to the drawing which is for illustrative purposes only:

Fig. 3 is a somewhat diagrammatic section, on a small scale, showing primary flues, this section being taken on a plane represented by the line 3—3 of Fig. 2.

Figure 1:
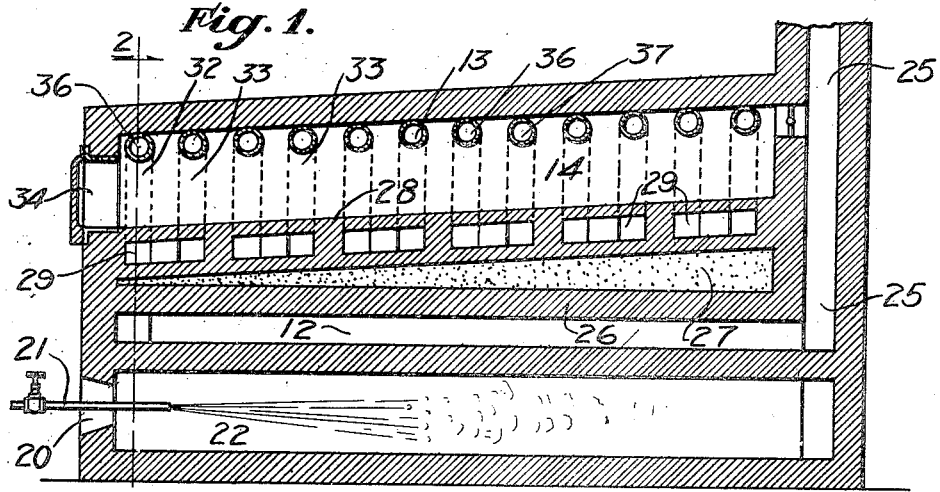
Fig. 1 is a vertical central section of an oven to which has been applied my improvement, taken on a plane indicated by the line 1—1 of Fig. 2.
Figure 2:
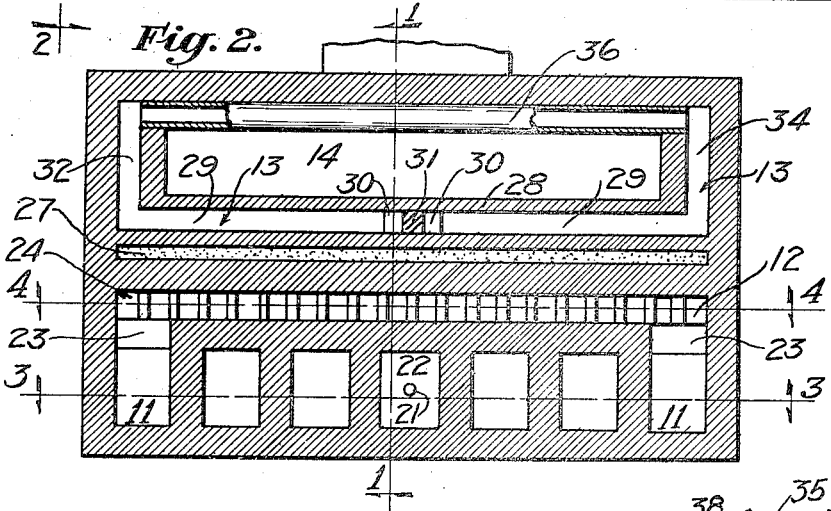
Fig. 2 is a section through the oven on a plane indicated by the line 2—2 of Fig. 1.
Figure 4:
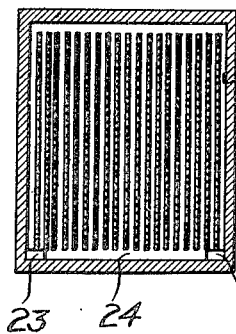
Fig. 4 is a somewhat diagrammatic section, on a small scale, showing the secondary flues, this section being taken on a plane represented by the line 4—4 of Fig 2.

The oven, which may be constructed of brick or other similar material, consists essentially of walls forming primary flues 11, secondary flues 12, equalizing channels 13, and a baking chamber 14. Formed in the front of the furnace is a fire door 20 through which a suitable gas or oil burner 21 projects, the principal combustion taking place in the center flue 22 of the primary flues 11. The hot gases then pass in the course indicated by the arrows in Fig. 3 through the other primary flues successively in two series, the hot gases finally rising through openings 23 into the front end chamber 24 extending across the front of the furnace and connecting with each of the secondary flues 12. The hot gases then pass through these secondary flues 12 to the rear of the furnace and upwardly through a chimney or stack 25.

Placed on the top wall 26 of the secondary flues 12 is a body of sand 27 which is thin at the forward end and of increasing depth at the rear, as best shown in Fig. 1. Superimposed upon this sand is the floor 28 of the baking chamber 14, this floor being pierced at regular intervals by a series of laterally extending ducts 29 which form the lower portion of the equalizing channels 13 and are connected together so as to act in pairs by interconnecting ducts 30 which are separated by a wall 31 located centrally of the structure. The ducts 29 extending outward from the centrally located ducts 30 join with vertical ducts 32, 33, 34 and 35, situated within the side walls of the oven. Pipes 36 extend across the upper part of the baking chamber and connect between the upper ends of the vertical ducts 32 and 34, and similar pipes 37 connect between the upper ends of the vertical ducts 33 and 35.

Figure 5:
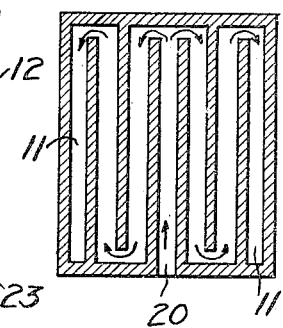
Fig. 5 is an isometric perspective diagram representing one set of equalizing channels, and is provided to better illustrate the circulation of heat therethrough.
Figure 5:
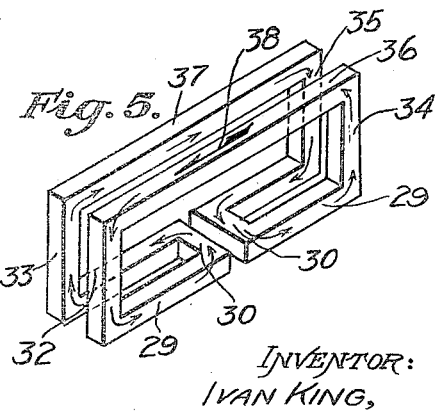

In explaining the action within the equalizing channels 13 I make use of a diagrammatic isometric perspective Fig. 5 in which one set of the equalizing channels is shown in outline. It will be noticed that each of the equalizing channels 13 is comprised of a pair of substantially parallel chamber surrounding ducts, each of these ducts being composed of a pipe 36 or 37, two of the vertical ducts, and the two laterally extending ducts 29 leading thereinto, and continuous circulation is provided for by the interconnecting ducts 30.

It is the natural tendency for heated air to flow to such spots where the greatest amount of heat is being dissipated, and in the case of the circulation of heated air within the equalizing channels there will be a preponderance of flow in the direction of the cooler spots in the radiation pipes 36 and 37, and by such a flow a continuous circulation will be induced within the equalization channels. In the diagram Fig. 5, a continued flow in the direction as indicated by the arrow 38 would start a continuous circulation of air throughout the equalizing channel as indicated by the system of arrows. The heated air traveling in the direction of the arrow 38, becoming cooled by the radiation of its heat through the walls of the pipe 36, drops down the vertical duct 32 into the adjoining lateral duct 29 and in passing therethrough and into the opposite duct 29 through the interconnecting duct 30, is again heated and rises through the vertical duct 33. In passing through the pipe 37 the heated gas is subjected to cooling by the radiation of its heat through the walls of the pipe 37 and upon reaching the vertical duct 35, through which it drops, is again in a position to absorb heat from the walls of the lateral ducts 29 and the interconnecting duct 30, whereupon it rises through the vertical duct 34 and enters pipe 36 preparatory to making another circuit of the equalizing channel.

With my previous type of oven having equalizing channels completely encircling the baking chamber the circulation of heated air in the channels is in the same direction throughout the entire set of equalizing channels, thereby delivering an excess of heat to one side of the baking chamber. It will be perceived in the form of construction shown herein that the equalizing channels do not entirely encircle the baking chamber, but return back upon themselves at a point approximately in the center of the baking chamber floor, and it will be further perceived that in so doing a circuit for the passage of hot air is formed in which the flow within each pair of the radiating pipes is maintained in opposite directions, thereby giving a uniform distribution of heat throughout the baking chamber. The construction shown is that of a preferred type, and it is not to be considered necessary that this construction be strictly adhered to, as the equalizing channels will perform equally well with the interconnecting ducts located in the upper central part of the channel or elsewhere instead of in the location shown.

I claim as my invention:

1. In an oven, the combination of: walls forming a baking chamber; a heat receiving body having laterally extending ducts therein extending transversely across said baking chamber; pipes extending across the upper portion of said baking chamber; vertical ducts in each wall of said chamber, each duct connecting one end of one of said laterally extending ducts with one end of one of said pipes; and interconnecting ducts so placed as to connect an adjacent pair of said pipes and its connected ducts into a single closed loop.

2. In an oven, the combination of: walls forming top ducts in thermal contact with the top of the baking chamber, walls forming bottom ducts in thermal contact with the bottom of the baking chamber; walls forming side ducts at either side of said oven chamber, each of said side ducts connecting one end of one of said top ducts with one end of one of said bottom ducts to form a single loop about the baking chamber; walls interrupting the continuity of said loops and walls forming interconnecting ducts joining the broken ends of adjacent loops to form a single continuous passage around said adjacent loops.

In testimony whereof, I have hereunto set my hand at Los Angeles, California, this 28th day of March, 1921.

IVAN KING.